United States Patent Office 2,962,449
Patented Nov. 29, 1960

2,962,449

OZONE SOLUTIONS

John M. Gaines, New York, N.Y., assignor to Union Carbide Corporation, a corporation of New York No Drawing. Filed Nov. 19, 1956, Ser. No. 622,750

1 Claim. (Cl. 252—186)

This invention relates to liquid ozone solutions, and more particularly concerns homogeneous ozone solutions which are convenient and safe to handle.

Liquid oxygen has long been used as a diluent for ozone because of its high solvent powers for ozone, and the fact that ozone and oxygen are miscible and compatible within certain proportions. As is known, a solution of ozone in liquid oxygen is capable of existing in either of two forms. Below concentrations of about 24.3 weight percent (17.6 mole percent) ozone in liquid oxygen at −183° C., the solution ingredients are compatibly miscible in all proportions, and form a relatively low density, homogeneous solution. This light ozone-containing phase is relatively resistant to explosion. At temperatures below the critical solution temperature (approximately −180° C.) efforts to dissolve more ozone than about 24 weight percent in liquid oxygen have failed. Additional ozone forms a high-density, ozone-rich liquid phase containing about 67 mole percent ozone, which explodes with great violence if sufficiently stimulated.

It is, therefore, an important object of the present invention to provide an ozone solution having a greater stability at higher concentrations than present day ozone solutions.

Another object of the invention is to provide convenient means for handling fairly concentrated solutions of ozone in liquid oxygen.

Another object of the invention is to provide a solution of ozone in liquid oxygen at ozone concentrations in excess of 24 weight percent, wherein the instability normally encountered by formation of a heavy ozone-rich phase and the attendant dangers are substantially minimized.

Yet another object of the present invention is to provide a solution of ozone in oxygen having an ozone concentration above 24%, the solution being under such conditions that only a single liquid phase exists.

Other objects, features and advantages of the present invention will be apparent from the following detailed description.

In the description that follows, unless otherwise specified, the term "percentage" is intended to refer to weight percentages.

In accordance with the invention, a more highly concentrated ozone solution may be obtained than has heretofore been achieved without encountering the dangers and difficulties inherent in present day ozone-oxygen solutions if the solution of ozone in oxygen is maintained above the critical solution temperature. This phenomenon occurs at a temperature of about −179.9° C. To secure substantial benefits, the temperature of the ozone solution of the invention should preferably be between about −179.9° C. and −140° C. Above about −140° C. the vapor pressure of ozone becomes high. This has the disadvantage that vapor phase explosions can occur when the ozone partial pressure is above about one-tenth of one atmosphere.

According to the invention, at temperatures above the critical solution temperature, the explosion hazards which previously had been experienced in ozone in oxygen solutions are substantially reduced, and the safe upper limit of ozone concentration is raised from about 24% to approximately 35% ozone. In this range of ozone concentration, the ozone and oxygen are compatibly miscible, and only a single liquid phase exists.

The formation of the ozone-oxygen solutions of this invention may be accomplished in any of several ways. One method involves passing a gaseous mixture of oxygen and ozone, for example, the effluent from an ozonizer of the silent electrical discharge type, which normally would contain from 2% to 4% ozone, the balance being oxygen, when pure oxygen has been used as the ozonizer charge gas, through liquid oxygen at its normal boiling point at atmospheric pressure. The ozone gas is dissolved in the liquid oxygen essentially completely and the ozone content of the liquid phase can be easily calculated from observed rates of flow of the gases entering the liquid container, weight change of the liquid and concentration of the ozone in the gas from the ozonizer. Another means of determining the ozone content of the liquid is by density of the liquid.

At −183° C. one can safely dissolve up to about 24 weight percent ozone in the liquid oxygen. The liquid solution is then pressurized and warmed up to above about −180° C. and increased in its ozone concentration by allowing the escape of the vapor phase, which is essentially all oxygen, while maintaining the system under its autogenous pressure.

The ozone solution of the invention helps to overcome a formidable safety handicap in the handling, storage, transportation and chemical reaction of ozone. It is also useful as a source of concentrated ozone for carrying out chemical reactions, as by flash vaporizing the concentrated ozone from solution into a reaction zone.

From the above description it will be seen that ozone may be incorporated in a liquid oxygen solvent in concentrations above 24% and as high as 35% ozone when the temperature of the ozone solution is maintained between about −180° C. and −140° C. Yet the ozone is compatibly miscible with the oxygen, and forms a homogeneous solution in which only a single liquid phase exists.

It will be understood that modifications and variations may be effected without departing from the spirit and scope of the novel concepts of the present invention.

What is claimed is:

Method of safe handling a relatively high concentration of liquid ozone which comprises providing a solution of liquid ozone in liquid oxygen, maintaining the ozone concentration at between 24% and 35% by weight at a temperature between −180° C. and −140° C. and at a sufficient superatmospheric pressure to maintain the solution in the liquid state, whereby a single phase, stable, homogeneous ozone solution is formed.

References Cited in the file of this patent

UNITED STATES PATENTS 2,704,274    Allison _____ Mar. 15, 1955

OTHER REFERENCES

Mellor: "Comprehensive Treatise on Inorganic and Theoretical Chemistry," vol. 1, page 894, 1922, Longmans, Green & Co., N.Y.